(12) United States Patent
Motter et al.

(10) Patent No.: US 8,252,864 B2
(45) Date of Patent: Aug. 28, 2012

(54) POLYMERIZATION-ENHANCING COMPOSITION FOR UREA-FORMALDEHYDE RESINS, METHOD OF MANUFACTURE, METHOD OF USE, AND ARTICLES FORMED THEREFROM

(75) Inventors: William K. Motter, Eugene, OR (US); David M. Harmon, Eugene, OR (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 1977 days.

(21) Appl. No.: 11/192,983

(22) Filed: Jul. 29, 2005

(65) Prior Publication Data

US 2006/0057353 A1 Mar. 16, 2006

Related U.S. Application Data

(60) Provisional application No. 60/592,817, filed on Jul. 30, 2004.

(51) Int. Cl.
*C08G 12/12* (2006.01)
*D21H 17/49* (2006.01)
*C08L 79/00* (2006.01)

(52) U.S. Cl. ......... 524/599; 524/13; 528/232; 528/368; 162/164.6

(58) Field of Classification Search .............. 428/297.4; 526/208; 524/599, 13; 528/232, 268; 162/164.6
See application file for complete search history.

(56) References Cited

U.S. PATENT DOCUMENTS

| | | | |
|---|---|---|---|
| 2,313,953 A | 3/1943 | Loughborough | |
| 3,150,956 A | 9/1964 | Smith et al. | |
| 3,537,887 A | 11/1970 | Blohm | |
| 4,161,467 A | 7/1979 | Markessini | |
| 4,325,711 A | 4/1982 | Kober et al. | |
| 4,393,019 A * | 7/1983 | Geimer | 264/83 |
| 4,663,239 A * | 5/1987 | Pearson | 428/524 |
| 4,812,366 A * | 3/1989 | Duncan et al. | 428/528 |
| 4,843,126 A * | 6/1989 | Quinn | 525/162 |
| 4,906,484 A | 3/1990 | Lambuth et al. | |
| 5,079,067 A * | 1/1992 | Willging | 428/182 |
| 5,093,058 A | 3/1992 | Harmon et al. | |
| 5,162,394 A * | 11/1992 | Trocino et al. | 523/208 |
| 5,534,305 A * | 7/1996 | Fujiki et al. | 427/393 |
| 5,635,583 A | 6/1997 | Motter et al. | |
| 6,228,914 B1 * | 5/2001 | Ford et al. | 524/124 |
| 2002/0115774 A1 * | 8/2002 | Afiouni | 524/416 |
| 2002/0173565 A1 * | 11/2002 | Blount | 524/100 |

FOREIGN PATENT DOCUMENTS

| | | |
|---|---|---|
| CA | 1 067 638 | 12/1979 |
| DE | 299 815 A5 | 5/1992 |
| EP | 0 053 762 A1 | 6/1982 |
| EP | 0 324 293 A1 | 7/1989 |
| EP | 0 747 433 A2 | 12/1996 |
| GB | 1 075 754 | 7/1967 |
| JP | 61-89003 | 5/1986 |

OTHER PUBLICATIONS

International Search Report; International Application No. PCT/US2005/027305; Date of Mailing Nov. 21, 2005.
Written Opinion; International Application No. PCT/US2005/027305; Date of Mailing Nov. 21, 2005.
E. E. Ferg, et al, "C NMR Analysis Method for Urea-Formaldehyde Resin Strength and Formaldehyde Emision", Journal of Applied Polymer Science, vol. 50, 1993, pp. 907-915.
Römpp Chemie Lexikon (1989) p. 171.

* cited by examiner

*Primary Examiner* — Michael Pepitone

(57) ABSTRACT

An aqueous reaction product of a composition that may consist essentially of a source of an acid having a pKa in water of about 2 to about 8, a source of a base having a pKb in water of about 2 to about 6, and urea. A curable urea/formaldehyde resin composition may contain a curable urea/formaldehyde resin and the foregoing composition, and may be made by combining the resin with the composition. A reconstituted wood product may be made by combining particulate lignocellulosic material with the foregoing curable resin, and curing the resin. Optionally, a reconstituted wood panel may contain a particulate lignocellulosic material and a binder composition comprising the cured product of curable resin and the aforesaid aqueous reaction product. A concentrate for forming a polymerization enhancing composition is also disclosed.

1 Claim, No Drawings

POLYMERIZATION-ENHANCING COMPOSITION FOR UREA-FORMALDEHYDE RESINS, METHOD OF MANUFACTURE, METHOD OF USE, AND ARTICLES FORMED THEREFROM

CROSS-REFERENCE TO RELATED APPLICATION

This application claims the benefit of U.S. Provisional Application Ser. No. 60/592,817, filed Jul. 30, 2004, which is incorporated herein by reference in its entirety.

BACKGROUND

The present invention relates to urea-formaldehyde resins, including melamine-urea-formaldehyde resins, and in particular to compositions for enhancing the polymerization of such resins.

Urea-formaldehyde (UF) resins have been used for over forty years as binders for reconstituted wood-based panel products, for example interior grade particleboard, medium density fiberboard (MDF), and plywood. In use, the UF resin is combined with "furnish material", i.e., particles, flakes, fibers, or sheets of a cellulosic or lignocellulosic material, formed into mats where appropriate, stacked, and compressed between heated platens in a hot press to form a board product of the desired thickness and density. These board products are often subjected to secondary hot pressing operations, including lamination. UF resins are used because they result in boards with high physical strength properties, allow board production at relatively high production rates and minimal energy consumption, and are much more cost-effective than alternative binders.

UF resins are commonly cured using a combination of a moderate increase in acidity and elevated temperatures. The increase in acidity may be brought about by contact with the wood product and/or by the addition of an acid-generating catalyst, typically the ammonium salts of sulfuric, hydrochloric or nitric acids. Such catalysts allow faster cure in the presence of lower amounts of formaldehyde; however, their catalytic efficiency decreases significantly at F:U mole ratios less than 1.0. After resin cure, the continued presence of the acid catalysts can catalyze the reverse reaction, causing polymer degradation especially during hot stacking of the board and/or during secondary hot-pressing operations. To significantly mitigate this latter effect, a buffered catalyst system has been developed, as disclosed in U.S. Pat. No. 5,635,583 to Motter et al. This catalyst system comprises an aqueous solution of a buffering salt (preferably dipotassium phosphate) adjusted to a pH of about 8.5 to about 2.0, phosphoric acid, and ammonium sulfate. The buffering salt solution most preferably includes an acid to achieve a pH in the lower half or below the buffering range of the buffering salt solution.

UF resins have also been modified by the incorporation of low amounts (0.1 to 5.0 weight %) of melamine to produce low F:U mole ratio (typically <1.0:1.0) hybrid (mUF) resins that resist degradation of polymer properties during hot stacking and secondary pressing operations, and that have low formaldehyde emissions. Overall, these resins cost more than conventional UF resins, require significantly higher application rates to achieve adequate physical board properties, and require significantly more cure time (and/or higher energy input). Conventional ammonium salt-based catalyst systems are not as effective in these mUF systems.

Additionally, a class of higher melamine content (>5 to about 30%) UF resins (MUF) have been used to manufacture products for applications requiring enhanced resistance to moisture. The cost, required rate of application and time required for cure of these resins generally increases in proportion to the melamine content.

There accordingly remains a need in the art for methods to enhance the polymerization of UF, mUF and/or MUF resins. In particular, there remains a need for compositions and methods that will improve the cure speed and/or lower the cure temperature for UF, mUF and/or MUF resins. Preferably such compositions and methods not significantly adversely impact, or will even improve, the advantageous properties of the resins.

SUMMARY OF THE INVENTION

The above-described drawbacks and disadvantages are alleviated by An aqueous reaction product of a composition that may consist essentially of a source of an acid having a pKa in water of about 2 to about 8, a source of a base having a pKb in water of about 2 to about 6, and urea.

A curable urea/formaldehyde resin composition may comprise, in combination, a curable urea/formaldehyde resin and a composition consisting essentially of the aqueous reaction product of a source of an acid having a pKa in water of about 2 to about 8, a source of a base having a pKb in water of about 2 to about 6, and urea.

A method for the manufacture of a curable urea/formaldehyde resin composition may comprise combining a curable urea/formaldehyde resin and a composition consisting essentially of the aqueous reaction product of a source of an acid having a pKa in water of about 2 to about 8, a source of a base having a pKb in water of about 2 to about 6, and urea.

A method for the manufacture of a reconstituted wood product may comprise combining a particulate lignocellulosic material; a curable urea/formaldehyde resin; and the aqueous reaction product of a composition consisting essentially of a source of an acid having a pKa in water of about 2 to about 8, a source of a base having a pKb in water of about 2 to about 6, and urea; and curing the curable urea/formaldehyde resin.

In one embodiment, a reconstituted wood panel may comprise a particulate lignocellulosic material and a binder composition comprising the cured product of a curable urea/formaldehyde resin and the aqueous reaction product of a composition consisting essentially of a source of an acid having a pKa in water of about 2 to about 8, a source of a base having a pKb in water of about 2 to about 6, and urea.

Another embodiment provides a concentrate for the formation of a polymerization enhancing composition that may consist essentially of a source of an acid having a pKa in water of about 2 to about 8, a source of a base having a pKb in water of about 2 to about 6, and urea.

The above-described and other features are exemplified by the following detailed description.

DETAILED DESCRIPTION

It has been discovered by the inventors hereof that the reactivity of curable urea/formaldehyde resins and/or the performance of cured urea/formaldehyde resins are enhanced by cure of resin in the presence of a composition comprising the aqueous reaction product of urea, an acid having a pKa in water of about 2 to about 8, for example a phosphorus oxyacid, a base having a pKb in water of about 2 to about 6, for example ammonia. In a particularly advantageous feature, use of these compositions in the manufacture of reconstituted wood-based panel products allows a significant reduction in the total amount of the applied resin solids without significantly adversely affecting board properties and/or board production rates. This result is surprising because of the belief in the art that it is necessary to use strong acids to attain good cure speeds. It is even more surprising because it is generally believed in the art that both urea and ammonia retard cure, rather than improve it.

In one embodiment, a polymerization-enhancing composition consists essentially of the reaction product of urea, a weak acid, i.e., an acid having a pKa in water (at 25° C.) of about 2 to about 8, and a weak base, i.e., a base having a pKb in water (at 25° C.) of about 2 to about 6, wherein the reaction occurs in aqueous solution. By "consists essentially of" it is meant that the composition is free of any additional components that would substantially adversely affect the catalytic nature of the composition with respect to curable urea/formaldehyde resins. It has further been found advantageous to prepare the reaction product prior to combining with a urea/formaldehyde resin. "Consisting essentially of" therefore also means that polymerization-enhancing composition contains an aqueous reaction product that is prepared substantially or entirely in the absence of a urea/formaldehyde resin.

In another embodiment, the polymerization-enhancing composition consists of the reaction product of an acid, i.e., an acid having a pKa in water of about 2 to about 8, with a weak base, i.e., a base having a pKb in water of about 2 to about 6, and urea in water. By "consists of" it is meant that the reaction product is formed from a composition that contains no additional components other than the impurities and/or by-products normally found in the acid, weak base, urea, and water.

The particular acid and base are selected so as to provide effective enhancement of the polymerization of a urea/formaldehyde resin. As used herein, "enhancement" includes an increase in the rate of the reaction compared to the same reaction without the polymerization-enhancing composition, and/or an improvement in the product produced by the polymerization. Improvements in the product may be, for example, improved bond strength, improved mechanical properties such as tensile strength, water absorption or the like, or a decrease in the amount of resin solids required to obtain the same properties without the polymerization-enhancing solution. Such acids and bases may be selected using the guidelines provided below Where the acid has multiple pKas, at least one pKa is in the range of about 2 to about 8. In alternative embodiments, the acid has a pKa of about 2 to about 3, about 3 to about 4, about 4 to about 5, about 5 to about 6, about 6 to about 7, and/or about 7 to about 8. The acid may also have a pKa of about 2 to about 4, and/or about 6 to about 8. Examples of suitable acids include but are not limited to inorganic acids such as carbonic acid, phosphoric acid, polyphosphoric acid, phosphinic acid, phosphonic acid, and the like; and organic acids such as acetic acid, citric acid, formic acid, benzoic acids, phenols, phthalic acid, propionic acid, succinic acid, cinnamic acid, butanoic acids, sulfonic acids, and the like. A combination comprising at least one of the foregoing acids may also be used.

In one embodiment the polymerization-enhancing compositions are formed from a phosphorus oxyacid. Exemplary phosphorus oxyacids include but are not limited to phosphoric acid ($H_3PO_4$), phosphonic acid ($H_3PO_3$), and phosphinic acid ($H_3PO_2$), as well as the corresponding polyacids, for example, diphosphoric acid ($H_4P_2O_7$), triphosophoric acid ($H_5P_3O_{10}$), cyclotriphosphoric acid (also known as trimetaphosphoric acid), polyphosphoric acid (also known as metaphosphoric acid), diphosphoric(IV) acid (also known as hypophosphoric acid, $H_4P_2O_4$), diphosphoric(III-V) acid (also known as isohypophosphoric acid, $H_3P_2O_6$), diphosphonic acid (also known as pyrophosphoric acid, $H_4P_2O_5$), and the like. Sulfured and nitrogen analogs of phosphorus oxyacids are also included within the definition of phosphorus oxy acids, such as phosphinothioic O-acid, phosphinothioic S-acid, phosphinodithioic acid, phosphinimidic acid, phosphonothioic O,O'-acid, phosphonothioic O,S'-acid, phosphonodithioic S,S'-acid, phosphonotrithioic acid, phosphonimidothioic acid, and the like. While phosphorus oxyacids containing a limited amount of organic substitution, e.g., alkylphosphonic acids, may also be used, it is contemplated that the mineral acids are preferred in some applications for reasons of cost, efficacy, and similar considerations.

It is further to be understood that the term "acid" and "phosphorus oxyacid" is used for convenience, and is not intended to be limited to the protonated form of the acid. Thus the acid, for example the phosphorus oxyacid in the composition, may be derived in situ from a wide variety of acid sources, for example, the acids as exemplified above, the corresponding anhydrides, the corresponding monobasic, dibasic, tribasic, or higher salts, the corresponding halogen acids, the corresponding esters, and the like. Mixtures comprising at least one of the foregoing acid forms may also be used.

In a specific embodiment, a phosphorus oxyacid is added to the enhancing composition in form of the protonated acid itself, for example $H_3PO_4$. In another embodiment, the corresponding salts may be used, for example, ammonium, alkali and/or alkaline earth metal salts such as monosodium phosphate, disodium phosphate, monopostassium phosphate, dipotassium phosphate, and the like.

An embodiment comprising a phosphorous oxyacid may comprise an equilibrium reaction product, optionally, an equilibrium reaction product of the phosphorous oxyacid and urea.

The acid is combined with a weak base, i.e., a base having a pKb in water of about 2 to about 6. In other embodiments the base has a pKb of about 3 to about 5, specifically about 4 to about 5. Suitable weak bases include ammonia (pKb in water=4.75), or certain organic amines such as methylamine, ethylamine, ethanolamine, triethanolamine, morpholine, and triethylamine ("amine triethyl") "aqua ammonia" (ammonium hydroxide) and the like. The terms "ammonia" and "amine" are used for convenience, and are not intended to be limited to the unprotonated forms of the bases. The base may be derived in situ from a wide variety of base sources, for example, the bases as exemplified above, the corresponding salts, and the like. Thus, ammonia or an amine may be added to the composition in the form of a gas or aqueous solution. Alternatively, ammonia or an amine may be added in the form of a salt, for example a halide salt or the acid addition salt of the acid having a pKa of about 2 to about 8.

It is convenient to have the source of the acid and the base be the same, that is, the same salt. For example, ammonia and an oxyphosphorus acid is added in the form of an ammonium salt of the phosphorus oxyacid, for example monoammonium phosphate (($NH_4$)$H_2PO_4$), diammonium phosphate (($NH_4$)$_2HPO_4$), and the like, and citric acid and ammonia may be provided by ammonium citrate. Such salts may also be used in combination with an additional acid or base source. Ammonia may also be provided by the reaction of urea and a phosphorus oxyacid at an effective temperature (for example, room temperature up to about 104° C.) for an effective time (for example 0.25 to about 12 hours). In this embodiment, urea serves as the source of ammonia.

The urea may be derived from a variety of commercially available forms, for example solid urea, such as prill, and aqueous urea solutions.

The sources of the acid, the weak base, and the urea are combined in an aqueous solution to provide a reaction product. "Solution" as used herein is intended to encompass mixtures, dispersions, and other combinations wherein all or a part of the reactants are dissolved. Small amounts of a miscible or immiscible cosolvent may be present in the aqueous solution, for example up to about 10 volume percent (vol %) of a cosolvent such as methanol, isopropanol, acetone, and the like, based on the combined volumes of water and cosolvent. Preferably, 100 vol % water is used. Other components may be present during the reaction, provided that they do not significantly adversely affect the reaction or the properties of the reaction product. In one embodiment, no other components are present, other than the natural or inevitable contaminants present in the starting materials and/or reaction product.

Also within the scope of the present invention is a concentrate useful for the formation of a polymerization-enhancing composition for curable urea/formaldehyde resins, wherein the concentrate comprises, in combination, precursors for the formation of the aqueous reaction product of an acid having a pKa in water of about 2 to about 8, a base having a pKb in water of about 2 to about 6, and urea. Most conveniently, the concentrate is provided in a "dry" form, that is, a mixture of solid components that can be added to water to form the polymerization enhancing composition. Such concentrates include, for example, a combination of solid urea, a solid salt of the acid, and a solid salt of the base; solid urea and the combined salt of the acid and weak base (for example monoammonium phosphate, diammonium phosphate, and the like); urea salts of the acid and a salt of the weak base; or a urea salt of the acid and a combined salt of the acid and weak base. In one embodiment, the concentrate consists essentially of, or consists of, precursors of an acid having a pKa in water of about 2 to about 8, a base having a pKb in water of about 2 to about 6, and urea. In another embodiment is provided free of a urea/formaldehyde resin. In another embodiment, the concentrate consists essentially of, or consists of, an acid having a pKa in water of about 2 to about 8, a base having a pKb in water of about 2 to about 6, and urea.

Preferably, the concentrate contains the reactants (or reactant precursors) in amounts effective to provide the appropriate ratios of the reactants upon dilution with the aqueous solution. Suitable amounts may be readily determined by one of ordinary skill in the art without undue experimentation, based on the guidance provided below. In an alternative embodiment, the concentrate is added and dissolved directly into the curable urea/formaldehyde resin in a use tank or suitable mixing tank. In this embodiment, the relative amounts of reactants (or reactant precursors) in the concentrate is preferably adjusted to provide the appropriate final concentration of reactants to the curable urea/formaldehyde resin.

The order of addition of the reactants to the aqueous solution does not appear to be important. As discussed above, the weak base and the acid may be provided separately, in the form of different salts, or together as a salt. The urea may also be provided separately or in the form of a salt with the acid. After combination in the aqueous medium, the reactants are allowed to stand or are mixed. Optionally, an equilibrium is established by adjusting the pH to the desired range. Reaction may occur at any effective temperature, preferably at room temperature or up to about 104° C.

Relative ratios of the acid, weak base, and urea may be varied depending on the particular acids and bases used, the particular urea/formaldehyde resin, the desired degree and speed of cure, the desired properties of the cured resin, and like considerations, and may be readily determined by one of ordinary skill in the art using the guidance provided herein. In one embodiment, the polymerization-enhancing composition is formed by the reaction of about 0.1 to about 70 weight percent (wt %) acid, about 0.1 to about 50 wt % weak base, and about 1 to about 55 wt % urea, with the balance being water. Specifically, the polymerization-enhancing composition may be formed by the reaction of about 1 to about 60 wt % acid, about 1 to about 40 wt % weak base, and about 10 to about 50 wt % urea, with the balance being water. In another embodiment, the polymerization-enhancing composition may be formed by the reaction of about 1 to about 40 wt % acid, about 1 to about 20 wt % weak base, and about 25 to about 50 wt % urea, with the balance being water.

In one specific embodiment the reaction product may be derived from a composition comprising about 1 to about 55 wt % urea, about 0.1 to about 65 wt % phosphoric acid and/or dipotassium phosphate, and about 0.1 to about 7 wt % ammonium hydroxide. Specifically, the reaction product may be derived from a composition comprising about 25 to about 50 wt % urea, about 0.5 to about 4.0 wt % phosphoric acid, specifically about 0.5 to about 1.5 wt % phosphoric acid, about 0.5 to about 15 wt % dipotassium phosphate, specifically about 0.5 to about 1.5 wt % dipotassium phosphate, and about 0.1 to about 2.0 wt % ammonium hydroxide, specifically about 0.1 to about 1.5 wt % ammonium hydroxide, with the balance being water.

In another specific embodiment the reaction product may be derived from a composition comprising about 1 to about 55 wt %, specifically about 25 to about 50 wt %, more specifically about 40 to about 50 wt % urea, about 0.1 to about 10 wt %, specifically about 0.5 to about 8 wt %, more specifically about 1.0 to about 6 wt %/o monoammonium phosphate, still more specifically about 0.5 to about 3 wt % monoammonium phosphate, up to about 20 wt %, specifically up to about 8 wt %, more specifically about 0.1 to about 4 wt % phosphoric acid, and up to about 7 wt %, more specifically up to about 4 wt %, still more specifically about 0.1 to about 2 wt % ammonium hydroxide, with the balance being water.

In still another specific embodiment, the reaction product may be derived from a composition comprising about 1 to about 55 wt %, specifically about 25 to about 50 wt %, more specifically about 40 to about 50 wt % urea, about 0.1 to about 12 wt %, specifically about 0.5 to about 10 wt %, more specifically about 1.0 to about 8 wt % liquid ammonium polyphosphate, with the balance being water.

Depending on the particular components used and the desired properties of the polymerization-enhancing composition, the pH of the composition may be adjusted after formation of the composition. In an embodiment of a product that comprises wood glue, for example, the pH of the reaction product may be adjusted to about 2 to about 9, optionally about 2.5 to about 8, or about 4.0 to about 7.5, specifically about 4.5 to about 6.5, or more specifically about 4.8 to about 6.3. The pH may be adjusted with a mineral acid such as sulfuric acid, an organic acid such as formic acid, a phosphorus oxyacid, other acids, or with ammonium or an alkali or alkaline earth metal base.

Advantageously, the polymerization-enhancing composition may optionally contain additional components that enhance or do not substantially adversely affect the properties of the polymerization enhancing composition. Additional components include the counterions of the acid or weak base, for example sulfates, nitrates and/or chlorides. Complex buffers may optionally be present, in order to maintain the pH of the composition at the desired level. The composition may also include various other additives, including dyes, pigments, sugars and carbohydrates, animal and vegetable proteins such as soy flour and their derivatives, and various lignosulfonates. Other possible useful additives might include rheology modifiers and polymer stabilizers, including but not limited to clays, chemically modified celluloses, polymeric alcohols and acetates. Further possible additives include monomeric or polymeric materials that will co-react with the urea formaldehyde resin and improve performance, such as melamine, resorcinol, or other reactive polymeric or monomeric materials known by those skilled in the art. Concentrations of these additives/modifiers in the polymerization-enhancing composition may vary from about 0.05 to about 30.0 wt %, for example about 1 to about 20.0 wt. % of the total polymerization enhancing composition.

There are a number of possible advantages associated with use of the polymerization-enhancing compositions. By combining a urea/formaldehyde resin with a polymerization-enhancing composition as described herein, the reactivity of the resin is enhanced, leading to a faster cure rate and/or more complete cure. Furthermore, boards manufactured using the polymerization-enhancing compositions may resist degradation during hot stacking and/or secondary hot pressing. Less resin may be used when the polymerization-enhancing composition is present, and yet provide a board having equivalent properties.

The polymerization-enhancing compositions are furthermore suitable for use with many of the so-called "low formaldehyde" urea/formaldehyde resins currently being developed. Since many of these formulations suffer from retarded cure, the present compositions can be used to improve the cure speed of these resins and/or the board properties obtained using these resins. In addition, cured urea/formaldehyde resins made with the polymerization-enhancing composition may release less formaldehyde than resins not made with the polymerization-enhancing composition. These advantages may be achieved with or without the use of scavenger resins, UF resins having a very low F/U ratio, or large quantities of mineral-acid-generating catalysts (e.g., ammonium salts of sulfuric, hydrochloric, or nitric acids).

As used herein, the term "urea/formaldehyde resin" includes all resins comprising the reaction product of urea and formaldehyde, including melamine-urea-formaldehyde resins and others. Thus, the polymerization-enhancing compositions may be used with a wide variety of curable urea/formaldehyde resins, including melamine-modified UF resins, ammonia-modified UF resins, phenol-modified UF resins, and other modified urea-formaldehyde resins, as long as the cure of the system relies primarily or partially upon the cure of the UF portion of the resin system. The polymerization-enhancing compositions are of particular utility with those curable urea/formaldehyde resins used as binders in reconstituted wood panel products such as particleboard, medium density fiberboard (MDF), plywood and glass mats, or any other industrial urea-formaldehyde adhesive resin application.

These curable urea/formaldehyde resin compositions may be prepared by methods known in the art, and generally contain reactive methylol groups which, upon curing, form methylene or ether linkages. Such methylol-containing adducts may include N,N-dimethylol, dihydroxymethylolethylene; N,N-bis(methoxymethyl), N,N-dimethylolpropylene, 5,5-dimethyl-N,N-dimethylol-ethylene, N,N-dimethylolethylene; and the like. Exemplary curable urea/formaldehyde resins usable with the polymerization-enhancing composition have a formaldehyde:urea or formaldehyde:(melamine+urea) (collectively referred to herein as F/(U+M) molar ratio of about 0.4:1 to about 3:1, specifically about 0.5:1 to about 2:1, more specifically about 0.6:1 to about 1.5:1. Suitable curable resins compositions generally contain about 30 to about 70 wt %, specifically about 50 to about 67 wt % resin solids, generally have a viscosity of about 5 to about 1800 cps, specifically about 10 to about 500 cps, and a pH of about 7.0 to about 9.5, specifically about 7.5 to about 9.0. The precursor resins may further have a free formaldehyde level of not more than about 3.0 wt %, and a water dilutability of about 1:1 to about 1000:1, preferably 5:1 and above.

Curable urea/formaldehyde resins of this type are commercially available, generally as an aqueous solution. The curable resin compositions may optionally contain a nitrogen-containing species such as ammonia, melamine, guanamine, alkanolamines, or polyamines, for example an alkyl primary diamine such as ethylenediamine (EDA). Additional modifiers, such as ethylene ureas, and primary, secondary and tertiary amines, for example, dicyanodiamide, can also be incorporated into the curable urea/formaldehyde resins, along with other optional additives. Conventional additives include, for example, silica colloid to enhance fire resistance; antifoamers; biocides; pigments; release additives; pH modifiers used during manufacture of the curable resins such as formic acid, sulfuric acid, sodium hydroxide and/or amines, and ammonia; mineral-acid generators such as ammonium sulfate, ammonium chloride and ammonium nitrate; neutral salts including potassium, magnesium and sodium chloride, magnesium and sodium sulfate; and buffers, including various carbonates, borates, and amines. Other known additives include sugars and carbohydrates, animal and vegetable proteins and their derivatives, and various lignosulfonates. Concentrations of these additives/modifiers in the reaction mixture often will vary from about 0.05 to about 20.0% by weight of the UF resin solids.

In one embodiment of a method of manufacture, a suitable curable urea/formaldehyde resin may be obtained by reacting formaldehyde and urea such that the F:U mole ratio at the beginning of resin manufacture is about 2.5:1 to about 1.5:1. The mixture of urea and formaldehyde is first adjusted to a mildly alkaline pH via addition of a base such as sodium hydroxide, ammonia, or an amine such as triethanolamine, and allowed to react at a pH of about 7.0 to about 8.5. Generally, this mixture of urea and formaldehyde is allowed to react at temperatures of about 50° C. to about 106° C. During this time, the formation of addition products, e.g. mono-, di- and tri-methylolureas occurs. After a short period of time the pH of the solution is generally reduced to below 7.0 to initiate a condensation reaction, which transforms the aforementioned methylolureas to methylene- and/or methylene ether-linked oligomers, ultimately resulting in polymeric materials of desired molecular weight range. Suitable curable urea/formaldehyde resins may also be prepared by employing a multistage resin polymerization step, wherein additional urea, or urea plus formaldehyde, or for example co-reactants such as melamine, is added to the reaction mixture after some amount of condensation has already occurred. Such resins may be prepared using two, three or more condensation steps wherein additional reactants are added each time. Such multistep condensation polymers can provide practical performance advantages over the more traditional single step condensed urea-formaldehyde resins.

At the completion of the polymer formation, the UF resinous material is neutralized. In one embodiment, urea may be mixed with the UF resinous material to lower the free formaldehyde and fuming potential of the resin. Common final F:U mole ratios are about 1.85:1 to about 0.6:1. For particleboard manufacture, preferred final F:U mole ratios are about 0.7:1 to about 1.3:1 and a typical final F:U mole ratio is about 1.1:1. This manufacturing method results in the urea-formaldehyde resin having a free urea content of about 0 to about 40 wt %, preferably about 10 to about 30 wt %, and a free formaldehyde content of 0 to about 2 wt % by weight of the resin solids. To complete the cure, further condensation is induced by reducing the pH to below 7.0.

The polymerization-enhancing composition may be combined with the curable urea/formaldehyde resin in various ways to form a binder composition. In one embodiment, the polymerization-enhancing composition is combined with the curable urea/formaldehyde resin just prior to use. For example, in the manufacture of a composite wood product or reconstituted wood product such as particleboard, the curable urea/formaldehyde resin and the polymerization-enhancing composition are blended to form a binder just prior to use. Mixing may occur at a temperature of about 5° C. to about 50° C., for up to about 120 minutes depending on the equipment and conditions in the board manufacturing facility. The binder is then applied to the wood surface or mixed with the wood furnish, which is then processed to its final form, e.g., medium density fiber board (MDF), wood particleboard, and the like.

In another embodiment, the polymerization-enhancing composition is co-applied onto a wood surface or furnish with the urea-formaldehyde resin. In yet another embodiment, the polymerization-enhancing composition may be applied to the wood surface or furnish before the urea-formaldehyde resin is applied. In still another embodiment, the polymerization-enhancing composition may be applied to the urea-formaldehyde resin after the resin is applied to a wood surface or furnish.

Effective cure temperatures and times are readily determined by those of ordinary skill in art, depending on factors such as the reactivity of the curable resin, desired cure time, and like considerations. In one embodiment the combination of the polymerization enhancing composition and curable urea/formaldehyde resin is set or cured at elevated temperatures below the decomposition temperature of the composition, for example at about 90° C. to about 200° C. At these temperatures, the curable urea/formaldehyde resins will typically cure in about 1 to about 60 seconds. Although cure may occur more rapidly at higher temperatures, excessively high temperatures can cause deterioration of the resin, which in turn causes a deterioration of the product's physical and functional properties. Heat treatment alone is sufficient to effect curing. Alternatively, catalytic curing in the presence or absence of heat may be used, such as is accomplished upon the addition of an acid-generating catalyst, e.g., ammonium chloride or ammonium sulfate; or upon the addition of a free acid, e.g., formic acid or p-toluene sulfonic acid.

The amount of the combination of the polymerization enhancing composition and curable urea/formaldehyde resin applied to the wood surface or furnish may vary considerably depending on the nature of the furnish and the desired properties of the final product, and is readily determined by one of ordinary skill in the art. In general, use of about 1 to about 45 wt %, specifically about 2 to about 35 wt %, and more usually about 3 to about 25 wt %, of resin solids are used, based on the oven-dry weight of the lignocellulosic component.

The above processes may be used to produce a variety of reconstituted wood panel products, including particleboard, chipboard, flakeboard, medium density fiberboard (MDF) and oriented strandboard (OSB). Particle boards are conventionally made by comminuting wood or other lignocellulosic material to the form of small pieces, blending mixtures of the small pieces with the above-described binder composition, dry-forming the resulting mixture into a mat, and hot-pressing the mat (in a platen or continuous press) to the desired density and thickness. The varieties of panel boards that may be manufactured in this manner include chipboard, flakeboard, and oriented strand board (OSB). Closely related fiber-based products are conventionally termed low density (LDF), medium density (MDF), and high density (HDF) fiberboards. These products have numerous applications, including in flooring, wallboard, cabinets, molding and millwork, and furniture components.

In certain embodiments, reconstituted wood panels prepared using the modified UF resins described herein have excellent physical properties, as reflected by compliance with recognized product standards, e.g. ANSI (North America), JIS/JAS (Japan), BS (U.K.), etc.

In certain embodiments, reconstituted wood panels prepared using the modified UF resins described herein have low formaldehyde emissions, specifically less than about 1.0 µg/ml, optionally less than about 0.40 µg/ml, as determined in accordance with ASTM D 5582-94. Alternatively, reconstituted wood-based panel products that meet applicable Japanese (JIS/JAS) F, F*, or F**** requirements for low formaldehyde emissions may be produced.

The binder composition may also be used with other organic and inorganic particulates or fibers for example, natural organic particulates such as carbohydrates and proteins, for example wheat flour, soy flour, and the like; organic fibers such as acrylic fibers, aromatic polyamide fibers, polyester fibers, cellulosic including cellulose fibers, and polyolefin fibers; and inorganic fibers such as glass fibers, mineral fibers, graphite fibers, metal fibers and metal-coated glass fibers or graphite fibers. The fibers generally comprise from about 50 to about 97 wt % of the solids in the bound product on a dry weight basis.

The above processes may be used to produce certain paper products, i.e., products based on chemically pulped cellulosic wood fibers from which the lignin has been removed.

The invention is further illustrated by the following non-limiting examples. In the examples, the following tests were used:

Internal bond was determined by ASTM D1037-97.

Formaldehyde emissions were determined in accordance with a modification of ASTM D 5582-94, "Standard Test Method for Determining Formaldehyde Levels from Wood Products Using a Desiccator"; pp. 1-6; reprinted from the Annual Book of ASTM Standards (1994), and are reported in micrograms per milliliter (µg/ml). The ASTM test was modified by use of four unwaxed 2 inch by 6 inch specimens.

Modulus of Rupture (MOR) was determined in accordance with a modification of ASTM D1037-97. The ASTM test was modified by use of 2 inch by 12 inch test specimens, a span of 10 inches, and a test head speed of 0.36 in/min.

The dry and pressure cooked shear tests are described by W. F. Lehmann, Outline of a Fast Durability Test for UF and PF Adhesives in Composite Materials, Proceedings, 20th International Particleboard/Composite Materials Symposium, Washington State University (1986).

EXAMPLE 1

Several UF resins were prepared by combining a non-melamine UF resin having a formaldehyde/urea molar ratio of 1.18:1 with each of solutions A, B, and C set forth in Table 1 below. The resulting pH of Solutions A, B and C was about 5.0 to 5.5.

TABLE 1

| Component | Solution A* (wt %) | Solution B* (wt %) | Solution C (wt %) |
|---|---|---|---|
| Water | 62.0 | 61.2 | 60.4 |
| Urea | 38.0 | 36.6 | 36.9 |
| Ammonium sulfate | — | 2.2 | — |
| 75% Phosphoric acid | — | — | 1.1 |
| Dipotassium phosphate | — | — | 0.8 |
| Diammonium phosphate | — | — | 0.21 |
| Total | 100.0 | 100.0 | 100.0 |

*Control

The solutions were added to respective portions of the base UF resin in amounts effective to lower the combined F:U molar ratio to 0.78:1. Solution B provided 1.44 grams ammonium sulfate per 100 grams of the base UF resin. Solution C provided a reaction phosphate equivalent of 1.2 grams per 100 grams of the base UF resin. The base resin and solutions were mixed just prior to using the resin to prepare samples of particle board. The particle boards were made using the following conditions:

Base resin solids application per OD (oven-dried) wood: 6%
0.7 inch (1.78 centimeter) out-of-press target thickness
47 lb/ft³ (752.8 kilogram/cubic meter) target density
10.5% mat moisture content
Press Temperature: 335° F. (168.3° C.)
Press Times: 210, 240, 270 seconds The boards were tested for internal bond strength, formaldehyde emissions, and retained pressure-cooked shear strength, with the results set forth in the following Table 2.

TABLE 2

| Modifying agent | Internal Bond (psi) Press Time (seconds) | | | Dessicator emission (μg/ml) (270 s press time) | Retained pressure-cooked shear (%) (270 s press time) |
|---|---|---|---|---|---|
| | 210 | 240 | 270 | | |
| Solution A* | 8 | 43 | 71 | 0.133 | 64.1 |
| Solution B* | 33 | 58 | 80 | 0.101 | 67.9 |
| Solution C | 49 | 77 | 84 | 0.075 | 71.3 |

*Control

The results of Table 2 show that the binder that included solution C had improved retained pressure-cook shear strength relative to the other binders. It further had lower emissions, faster cure, and better internal bond strength at each respective cure time.

EXAMPLE 2

Panels were prepared using both UF and MUF (1.5% melamine as a function of liquid resin weight) resins.

In the control examples (Examples 2A and 2C), the resins had a 0.77:1 F:U mole ratio, and cure was catalyzed with ammonium sulfate. These binders were applied at a rate of 7 wt %/o resin solids based on the oven-dried weight of the wood.

Resins in accordance with the present invention were also prepared (Examples 2B and 2D), by combining UF and MUF resins (1.5% melamine as a function of liquid resin weight) having an F:U mole ratio of 1:1 with an amount of a polymer enhancing solution effective to provide 1.25 g of phosphate per 100 g base resin and a final F:U mole ratio of 0.77:1.0. The polymer enhancing solution was formed from a composition comprising 51 wt % water, 45.4 wt % urea, and 3.6 wt % monoammonium phosphate. No ammonium sulfate was added to the resins. These binders were applied at 6% resin solids based on the oven dried weight of the wood.

The panels were made using the following conditions:
0.55 inch (1.4 centimeter) out-of press target thickness.
46 lb/ft³ (737 kilogram/cubic meter) target density.
10.0% mat moisture content by weight.
Press Temperature: 335° F. (168.3° C.).
Press Times of 170 seconds and 200 seconds.
2.5% solid ammonium sulfate per resin solids for control panels.

The test results are set forth in the following Table 3. Testing results for both press times were combined and averaged for internal bond, Modulus of Rupture (MOR), and the pressure cook shear test. Desiccator emissions were conducted only on the longest press time sample panels.

TABLE 3

| Composition | % Resin Solids | Internal Bond (psi) | MOR (psi) | Pressure Cook Shear (psi) | Formaldehyde Emissions (ug/ml) |
|---|---|---|---|---|---|
| UF Resins | | | | | |
| Example 2A* | 7.0 | 102 | 2036 | 180 | 0.08 |
| Example 2B | 6.0 | 107 | 2071 | 195 | 0.07 |
| MUF Resins | | | | | |
| Example 2C* | 7.0 | 131 | 2400 | 213 | 0.07 |
| Example 2D | 6.0 | 140 | 2525 | 208 | 0.07 |

*Control

The results of Table 3 clearly show that when the UF and MUF resin systems are combined with the polymer enhancing solution described herein (Examples 2B and 2D), the binders provide equivalent or better panel properties when applied at 15% lower resin solids treatment than UF and MUF resins cured using ammonium sulfate (Examples 2A and 2C).

EXAMPLE 3

As a control, panels were prepared by combining a UF resin with either a UF scavenger resin, or a polymerization enhancing solution. A UF resin having an F:U mole ratio of 1.20:1 was combined with a scavenger UF resin that lowered the combined F/U mole ratio of the UF resin plus UF scavenger resin combination to an F:U mole ratio of 1.06:1. The resin and scavenger resin were additionally combined with an ammonium sulfate solution to provide 1 wt % ammonium sulfate solids based on the total resin solids, and applied to wood furnish at a rate of 7% applied resin solids, based on the weight of oven-dried wood.

Panels were prepared in accordance with the present invention using the same UF resin having an F:U mole ratio of 1.20:1 combined with a polymer enhancing solution in an amount effective to provide 1.2 grams of phosphate per 100 grams of base resin, and to lower the combined F:U mole ratio to 1.06, and was applied at 5.8% resin solids to the wood furnish. The polymer-enhancing solution was derived from a composition comprising 69.8 wt % water, 22.5 wt % urea, 5.7 wt % monoammonium phosphate, and 2.0 wt % beet molasses.

Panels were prepared as follows:
0.65 inch (1.65 centimeter) out-of press target thickness.
46 lb/ft³ (737 kilogram/cubic meter) target density.
10.0% mat moisture content.
Press Temperature: 325° F. (163° C.).
Press Times of 180 seconds, 200 seconds, and 230 seconds.

Results are set forth in the following Table 4. Testing results for the two longest press times were combined and averaged for MOR, and the pressure cook shear test. Desiccator emissions were conducted only on the longest press time sample panels.

TABLE 4

| Example | Percent Applied Resin Solids | Internal Bond (psi) Press Time (s) | | | MOR (psi) | Pressure Cook Shear (psi) | Desiccator Emissions (ug/ml) |
|---|---|---|---|---|---|---|---|
| | | 180 | 200 | 230 | | | |
| UF Resin plus Scavenger Resin* | 7.0 | 21 | 68 | 122 | 2223 | 182 | 0.7 |
| UF resin plus polymerization enhancing composition | 5.8 | 27 | 101 | 125 | 2206 | 195 | 0.8 |

*Control

The results of Table 4 clearly show that the UF resin combined with the polymer enhancing solution provided faster cure, and equivalent panel properties even though it was applied at 17% lower resin solids treatment.

EXAMPLE 4

Several resins were prepared by combining a UF resin with an F:U mole ratio of 1.30:1 with each of solutions D, E, and F set forth in Table 5 below. The pH of Solutions D, E, and F was adjusted 5.70 before adding to the base resins. Solution E utilized formic acid to arrive at pH 5.7, whereas sulfuric acid was used in solution F.

TABLE 5

| Component | Solution D (wt %) | Solution E (wt %) | Solution F (wt %) |
|---|---|---|---|
| Water | 50.9 | 46.2 | 47 |
| Urea | 45 | 45 | 45 |
| Beet Molasses | 1 | 1 | 1 |
| Technical Grade Monoammonium Phosphate | 3 | — | — |
| 25% NaOH | 0.1 | — | — |
| Ammonium Polyphosphate Liquid | — | 6 | 6 |
| 25% Formic Acid | — | 1.8 | — |
| 25% Sulfuric Acid | — | — | 1 |

The solutions were added to a constant portion of the base resin in an amount effective to lower the combined F:U mole ratio to 1.0:1.0. Solution D provided 0.9 grams of monoammonium phosphate per 100 grams of the base UF resin. Solutions E and F were prepared using a commercially available ammonium polyphosphate material. Solutions E and F provided a reaction equivalent of 0.8 grams of available phosphoric acid, neutralized with ammonia. The base resin and solutions were mixed just prior to preparing samples of particleboard. The particleboards were made according to the following criteria:

Resin solids treatment: 7% based on the oven dried weight of wood
0.60 inches (1.52 cm) out-of-press target thickness.
47 lb/ft³ (787 kg/m³) target density.
11% mat moisture content.
Press Temperature: 325° F. (163° C.).
Press Times of 210, and 240 seconds.

The boards were tested for internal bond, modulus of rupture, formaldehyde emissions, and pressure-cooked shear strength. Resulting values for the two press times were combined, and averaged results set forth in the following Table 6.

TABLE 6

| Polymer Enhancing Solution | Internal Bond (psi) | MOR (psi) | Pressure Cook Shear (psi) | Desiccator Emissions (ug/ml) |
|---|---|---|---|---|
| D | 144 | 2467 | 271 | 0.347 |
| E | 153 | 2406 | 280 | 0.347 |
| F | 162 | 2435 | 289 | 0.285 |

The results in Table 6 illustrate that enhancing solutions E and F, which were prepared using ammonium polyphosphate, provided properties similar to or better than those of Solution D, which was prepared using monoammonium phosphate. Further, results illustrate that Solution F, which employed sulfuric acid to arrive at pH 5.7, provided enhanced performance over solution E, which employed formic acid to arrive at pH 5.7.

EXAMPLE 5

Particleboard panels were prepared by combining a standard 1.4 F:U mole ratio UF resin with either a 40% urea solution, or one of several polymer enhancing solutions, in amounts to result in a combined molar ratio of 0.95 F:U. The polymer enhancing compositions are set forth in Table 7 below. The resulting pH of solutions G through L was 5.70. Prior to application, the pH of the 40% urea solution was also adjusted to pH 5.7 using formic acid.

TABLE 7

| Component | G (wt %) | H (wt %) | I (wt %) | J (wt %) | K (wt %) | L (wt %) |
|---|---|---|---|---|---|---|
| Water | 54.8 | 52.7 | 52.9 | 52.1 | 50.9 | 46.7 |
| Urea | 40 | 40 | 40 | 40 | 40 | 40 |
| Beet Molasses | 2 | 2 | 2 | 2 | 2 | 2 |
| 25% NaOH | 0.2 | 0.3 | — | — | 1.1 | — |
| Monoammonium Phosphate | 3 | — | — | — | — | — |
| 75% Phosphoric Acid | — | 3.4 | 3.4 | 3.4 | — | — |
| 26 Be' Aqua Ammonia | — | 1.6 | — | — | — | — |
| Ammonium Citrate | — | — | — | — | 6 | — |
| Citric Acid | — | — | — | — | — | 5 |
| Ethanol Amine | — | — | 1.7 | — | — | — |
| Morpholine | — | — | — | 2.5 | — | — |
| Amino Triethyl | — | — | — | — | — | 6.3 |

The base resin and solutions were mixed just prior to using the resin to prepare samples of particleboard. The particleboards were made according to the following criteria:

Resin solids treatment: 6.5% based on the oven dried weight of wood.
0.55 inches (1.40 cm) out-of-press target thickness.
44 lb/ft$^3$ (705 kg/m$^3$) target density.
11% mat moisture content.
Press Temperature: 320° F. (160° C.)
Press Times of 185 and 215 seconds.

The panels were prepared and tested. Test values from the two press times were combined, and results are set forth in the following Table 8.

TABLE 8

| Additive | Internal Bond (psi) | MOR (psi) | Pressure Cook Shear (psi) | Desiccator Emissions (ug/ml) |
| --- | --- | --- | --- | --- |
| 40% Urea | 76 | 1671 | 173 | 0.219 |
| G | 108 | 1731 | 174 | 0.197 |
| H | 124 | 1945 | 206 | 0.137 |
| I | 110 | 1760 | 206 | 0.225 |
| J | 105 | 1780 | 195 | 0.236 |
| K | 106 | 1850 | 174 | 0.146 |
| L | 88 | 1738 | 182 | 0.298 |

The results given in Table 8 illustrate that the polymer enhancing compositions are effective in elevating various performance measures of particleboard panels relative to use of urea solution alone.

EXAMPLE 6

Particleboard panels were prepared using the same board-making conditions, materials, and polymer enhancing compositions employed in Example 5, except that in this set of panels, 1% solids of ammonium sulfate (based on the weight of resin solids) was added as an external catalyst and was combined with each resin mixture prior to application onto the wood.

The panels were prepared and tested. Test values from the two press times were combined, and results are set forth in the following Table 9.

TABLE 9

| Additive | Internal Bond (psi) | MOR (psi) | Pressure Cook Shear (psi) | Desiccator Emissions (ug/ml) |
| --- | --- | --- | --- | --- |
| 40% Urea | 110 | 1777 | 210 | 0.252 |
| G | 128 | 1847 | 201 | 0.205 |
| H | 125 | 1848 | 214 | 0.194 |

TABLE 9-continued

| Additive | Internal Bond (psi) | MOR (psi) | Pressure Cook Shear (psi) | Desiccator Emissions (ug/ml) |
| --- | --- | --- | --- | --- |
| I | 125 | 1834 | 194 | 0.239 |
| J | 127 | 2053 | 201 | 0.239 |
| K | 112 | 1845 | 191 | 0.197 |
| L | 133 | 1990 | 209 | 0.294 |

The results shown in Table 9 illustrate that the polymer enhancing compositions were effective in elevating various performance measures of particleboard panels relative to those of urea solution alone when further catalyzed with ammonium sulfate external catalyst.

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. Further, the terms "first," "second," and the like herein do not denote any order, quantity, or importance, but rather are used to distinguish one element from another.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for the manufacture of a reconstituted wood product, comprising combining
   a particulate lignocellulosic material;
   a curable urea/formaldehyde resin; and
   an aqueous reaction product of a composition consisting essentially of
   a source of an acid having a pKa in water of about 2 to about 8,
   a source of a base having a pKb in water of about 2 to about 6, and
   urea, wherein the aqueous reaction product is effect to enhance the polymerization of a urea/formaldehyde resin; and
   curing the curable urea/formaldehyde resin.

* * * * *